United States Patent
Chen et al.

(10) Patent No.: US 9,248,756 B2
(45) Date of Patent: Feb. 2, 2016

(54) PLUG-IN VEHICLE ECO CHARGING MODE

(71) Applicant: FORD GLOBAL TECHNOLOGIES, LLC, Dearborn, MI (US)

(72) Inventors: Elaine Y. Chen, Dearborn, MI (US); Jimmy Kapadia, Ottawa Hills, OH (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 36 days.

(21) Appl. No.: 14/200,058

(22) Filed: Mar. 7, 2014

(65) Prior Publication Data

US 2015/0251558 A1 Sep. 10, 2015

(51) Int. Cl.
*B60L 11/18* (2006.01)

(52) U.S. Cl.
CPC ......... *B60L 11/1862* (2013.01); *B60L 11/1809* (2013.01); *Y10S 903/903* (2013.01)

(58) Field of Classification Search
CPC ....... G01R 31/36; B60L 7/10; B60L 11/1838; B60L 11/1862; H01M 10/44
USPC ............. 701/22; 324/433; 320/137, 132, 107, 320/109
See application file for complete search history.

(56) References Cited

U.S. PATENT DOCUMENTS

| | | | |
|---|---|---|---|
| 6,094,033 A | 7/2000 | Ding et al. | |
| 7,825,630 B2 | 11/2010 | Stamos et al. | |
| 8,183,826 B2 | 5/2012 | Tuffner et al. | |
| 8,340,932 B2 | 12/2012 | Ichikawa | |
| 8,525,480 B2 | 9/2013 | Anderson | |
| 2007/0262749 A1 | 11/2007 | Luan et al. | |
| 2008/0042615 A1 | 2/2008 | Serrels et al. | |
| 2009/0013521 A1* | 1/2009 | Okumura et al. | 29/730 |
| 2009/0015202 A1* | 1/2009 | Miura | 320/132 |
| 2009/0288896 A1 | 11/2009 | Ichikawa | |
| 2011/0156641 A1 | 6/2011 | Kishiyama et al. | |
| 2013/0015860 A1* | 1/2013 | Crombez | 324/433 |
| 2013/0066493 A1 | 3/2013 | Martin et al. | |
| 2013/0226377 A1* | 8/2013 | Stanek et al. | 701/22 |

FOREIGN PATENT DOCUMENTS

| | | |
|---|---|---|
| DE | 102011007152 A1 | 10/2012 |
| DE | 102011075872 A1 | 11/2012 |
| DE | 102011085347 A1 | 5/2013 |
| EP | 1593937 A1 | 9/2005 |
| WO | 2008092757 A1 | 8/2008 |

* cited by examiner

*Primary Examiner* — Marthe Marc-Coleman
(74) *Attorney, Agent, or Firm* — David B. Kelley; Brooks Kushman P.C.

(57) ABSTRACT

A system for controlling battery charging in a vehicle includes a traction battery and a controller. The controller is configured to charge the traction battery to a SOC that is less than a maximum SOC based on an amount of charge predicted to be received from an anticipated regenerative braking event. The regenerative braking event is anticipated to occur during the next drive cycle. The target SOC may be set such that, upon occurrence of the anticipated regenerative braking event, the traction battery achieves the maximum SOC.

20 Claims, 7 Drawing Sheets

PLUG-IN VEHICLE ECO CHARGING MODE

TECHNICAL FIELD

This disclosure relates to increased efficiency charging strategies for traction batteries for plug in vehicles.

BACKGROUND

Plug-in electric vehicles, including plug-in hybrid vehicles (PHEVs) and battery electric vehicles (BEVs) have increased in prevalence as advancements in vehicle propulsion and battery technology have occurred. Such vehicles may be connected to an external charger to recharge a vehicle traction battery while the vehicle is parked. They also are generally equipped with regenerative braking, which enables the vehicle to capture a portion of the kinetic energy of the vehicle while braking.

SUMMARY

A system for controlling battery charging in a vehicle includes a traction battery and a controller. The controller is configured to charge the traction battery to a target state of charge that is less than a maximum charging state of charge. The difference between the target state of charge and the maximum charging state of charge is based on an amount of charge predicted to be received from an anticipated regenerative braking event. The regenerative braking event is anticipated to occur during the next drive cycle. The target state of charge is set such that, upon occurrence of the anticipated regenerative braking event, the traction battery achieves the maximum charging state of charge.

In one embodiment, the amount of charge is equal to a difference between the target state of charge and the maximum charging state of charge. In another embodiment, the amount of charge is based on a learned vehicle regenerative charging pattern. In yet another embodiment, the amount of charge is based on a topological profile at a detected charging location. In one such embodiment, the topological profile at the detected charging location is a local maximum elevation at the detected charging location.

A method for charging a battery in a hybrid electric vehicle includes charging the battery to a target state of charge that is less than a maximum state of charge by a predetermined charge quantity. The predetermined charge quantity corresponds with a predicted regenerative charge from an anticipated regenerative braking event for the next drive cycle.

In one embodiment, the predetermined charge quantity is based on a learned vehicle regenerative charging pattern. In another embodiment, the predetermined charge quantity is based on a topographical profile at a detected charging location.

A battery charger arrangement for a vehicle includes a battery charger. The battery charger is configured to charge a traction battery of the vehicle to a target state of charge in response to data indicative of an anticipated regenerative braking event for the next drive cycle. The target state of charge is less than a state of charge corresponding to a fully charged condition for the traction battery.

In one embodiment, the battery charger is further configured to, in response to user input, charge the traction battery to the state of charge corresponding to the fully charged condition. In another embodiment, the target state of charge is less than the state of charge corresponding to the fully charged condition by a predetermined charge quantity. The predetermined charge quantity corresponds with an amount of charge predicted to be received from the anticipated regenerative braking event. In one such embodiment, the predetermined charge quantity is based on a learned vehicle regenerative charging pattern. In another such embodiment, the predetermined charge quantity is based on a topographical profile at a detected charging location. The topographical profile may be a local maximum elevation at the detected charging location.

Embodiments according to the present disclosure provide a number of advantages. For example, systems and methods according to the present disclosure provide more efficient battery charging for plug in vehicles. In addition, such systems and methods recover regenerative energy that would otherwise be lost.

The above advantage and other advantages and features of the present disclosure will be apparent from the following detailed description of the preferred embodiments when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Plug-in vehicles, including PHEVs and BEVs, include a vehicle traction battery configured to supply electric power to a traction motor. The traction battery, traction motor, and other components cooperate as an electric drive system. In a BEV the electric drive system may be the only source of propulsive power to vehicle traction wheels, while a PHEV may additionally be provided with an internal combustion engine. Such vehicles may be connected to an external power supply to recharge the traction battery.

Figure 1A:
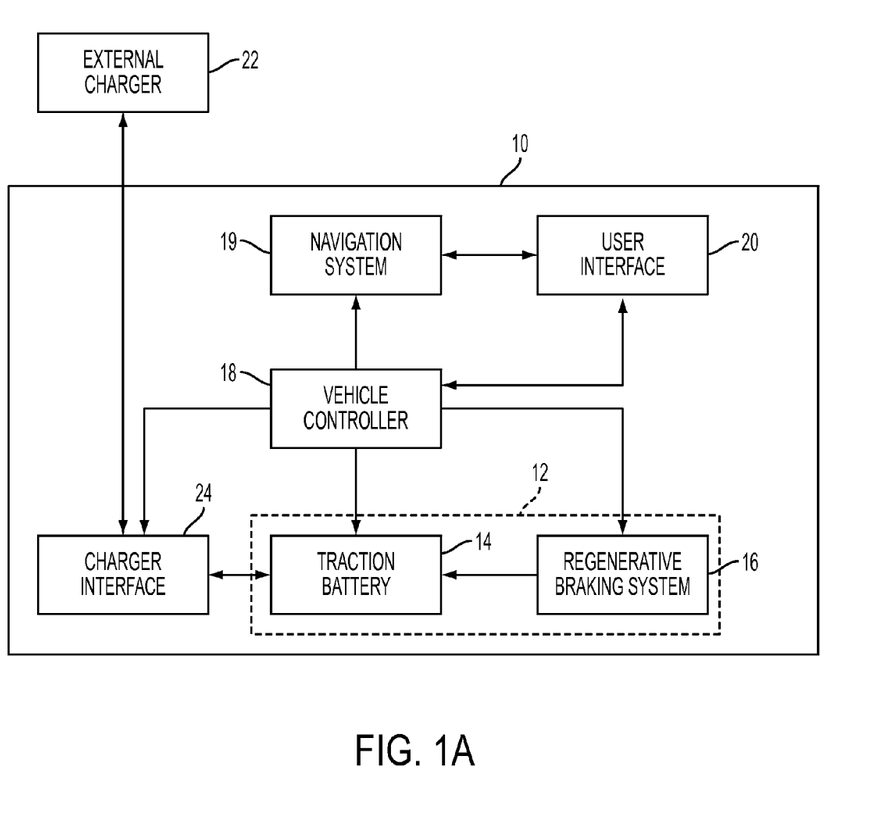
FIG. 1A is a schematic illustration of a plug in vehicle coupled with an external charger.

With reference to FIG. 1A, a vehicle charging system is illustrated according to an embodiment of the present disclosure. A vehicle 10 is provided with an electric drive system 12 including a traction battery 14 and a regenerative braking system 16. The regenerative braking system 16 is configured to recover vehicle kinetic energy and convert it into electric energy to charge the traction battery 14. In some embodiments, the regenerative braking system 16 may include a motor/generator configured to provide braking torque to vehicle wheels.

The vehicle 10 is additionally provided with a vehicle controller 18. The traction battery 14 and regenerative braking system 16 are in communication with or under the control of the vehicle controller 18. Although illustrated as a single controller, the controller 18 may include multiple controllers that operate in conjunction to control various vehicle systems. For example, the vehicle controller 18 may be a vehicle system controller/powertrain control module (VSC/PCM). In this regard, the vehicle charging control portion of the VSC/PCM can be software embedded within the VSC/PCM, or it can be a separate hardware device. The vehicle controller 18 generally includes any number of microprocessors, ASICs, ICs, memory (e.g., FLASH, ROM, RAM, EPROM and/or EEPROM) and software code to co-act with one another to perform a series of operations. The vehicle controller is in electrical communication with the vehicle battery, and receives signals that indicate the battery charge level. The vehicle controller 18 may further communicate with other controllers over a hardline vehicle connection using a common bus protocol (e.g., CAN), and may also employ wireless communication.

The vehicle 10 is provided with a navigation system 19. The navigation system 19 includes a positioning device such as a GPS system. The navigation system 19 may be equipped with a database including stored mapping data, with wireless communications to receive mapping data as needed, or a combination thereof. In some embodiments the navigation system 19 is installed in the vehicle 10, while in other embodiments the navigation system 19 may be a separate device such as a cell phone or standalone GPS that is connected to the vehicle via a wireless or wired connection. The navigation system 19 is in communication with the vehicle controller 18.

The vehicle 10 is further provided with a user interface 20. The user interface 20 may include a display monitor, touchscreen, mobile device interface, or other appropriate systems. The user interface 20 is in communication with the vehicle controller 18 and with the navigation system 19. The user interface transmits various user inputs to the vehicle controller 18, in response to which the vehicle controller 18 may adjust appropriate vehicle settings. The user interface also transmits various user inputs to the navigation system 19, in response to which the navigation system may choose navigation routes, save geolocations, or other take other appropriate actions.

An external charger 22 provides charging to the traction battery 14 via a charger interface 24. In one embodiment, the external charger is physically connected to the vehicle, i.e. the charger interface 24 includes a receptacle on the vehicle into which the charger 22 is plugged to form a direct connection. In another embodiment, the charger interface 24 includes at least one induction plate and the external charger 22 includes at least one charging coil which cooperate to form an inductive charging system. Other charging systems known in the art may also be used.

The charger interface 24 is in communication with and under the control of the vehicle controller 18. The vehicle controller 18 may control the charger interface 24 to selectively enable or disable recharging of the traction battery 14.

Figure 1B:
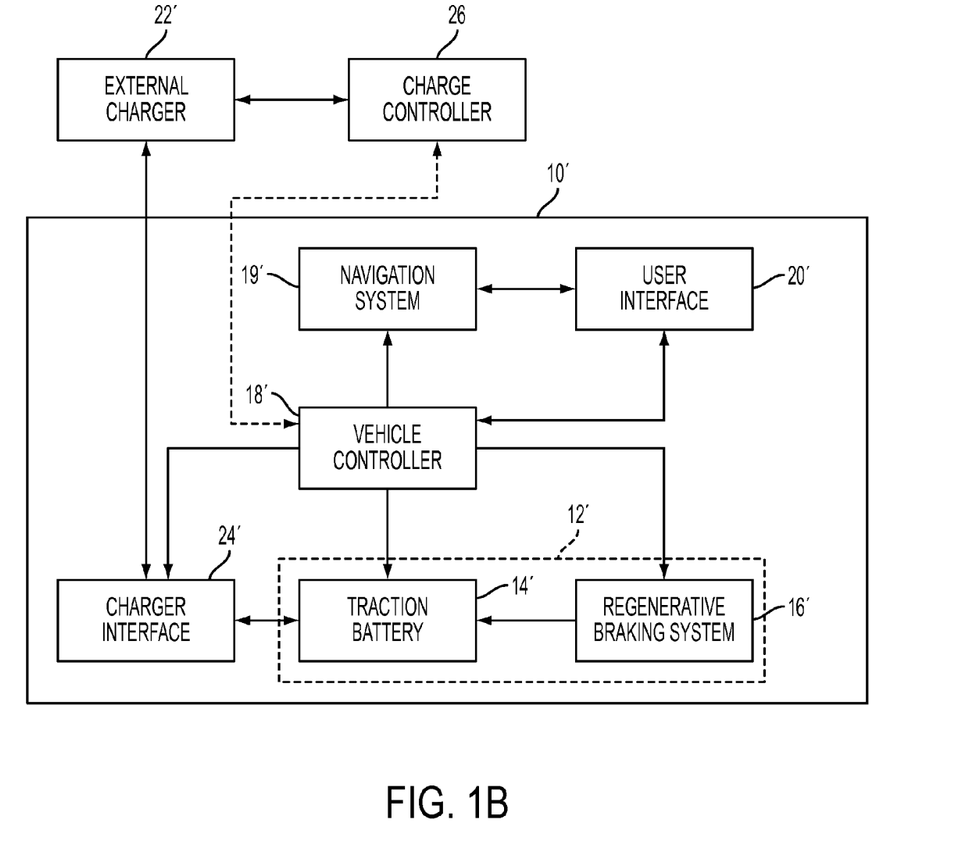
FIG. 1B is a schematic illustration of another embodiment of a vehicle coupled with an external charger.

Referring to FIG. 1B, another embodiment is shown. In this embodiment, a vehicle 10' is provided with an electric drive system 12' having a traction battery 14' and a regenerative braking system 16', a vehicle controller 18', a navigation system 19', a user interface 20', and a charger interface 24'. An external charger 22' is configured to charge the traction battery 14' via the charger interface 24'. The external charger 22' is additionally provided with a charger controller 26. The charger controller 26 is in communication with the vehicle controller 18'. The communication may occur over a communication bus if the charger physically connects with the vehicle. In embodiments having an inductive charger, the vehicle controller 18 may communicate with the charger controller 26 via a wireless communications system, such as RFID, NFC, Bluetooth, WiFi, or other methods known in the art. The charger controller 26 may control the external charger 22' to selectively enable or disable recharging of the traction battery 14'.

Figure 2:
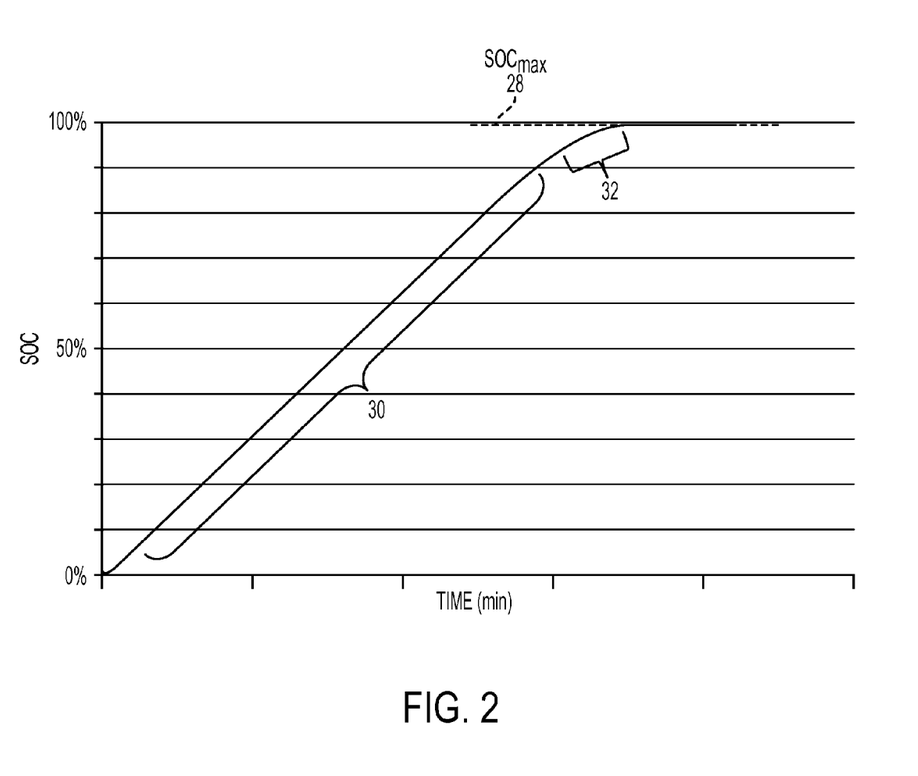
FIG. 2 illustrates a charge profile for charging a fraction battery in a plug in vehicle.

Referring now to FIG. 2, a charging profile for charging a vehicle traction battery is illustrated. In this illustrative example, the battery is fully discharged at time t=0. The battery is subsequently charged to a maximum state of charge ($SOC_{max}$) 28. The charging profile includes a high efficiency charging portion 30. In this region, the battery is charged with a substantially constant current. The profile additionally includes a reduced efficiency charging region 32 as the battery SOC nears $SOC_{max}$. In this region, the charging current is reduced.

Thus it may be understood that the "top off" portion of charging is a less efficient portion of the charging profile. As an additional consideration, higher battery SOCs may contribute to battery life degradation, both in terms of life due to charge/discharge cycles and in terms of calendar life. Consequently a more efficient charging profile may be desirable. However, a countervailing consideration is that any alternate charging profile should also provide adequate battery charge for an upcoming vehicle drive cycle.

Figure 3:
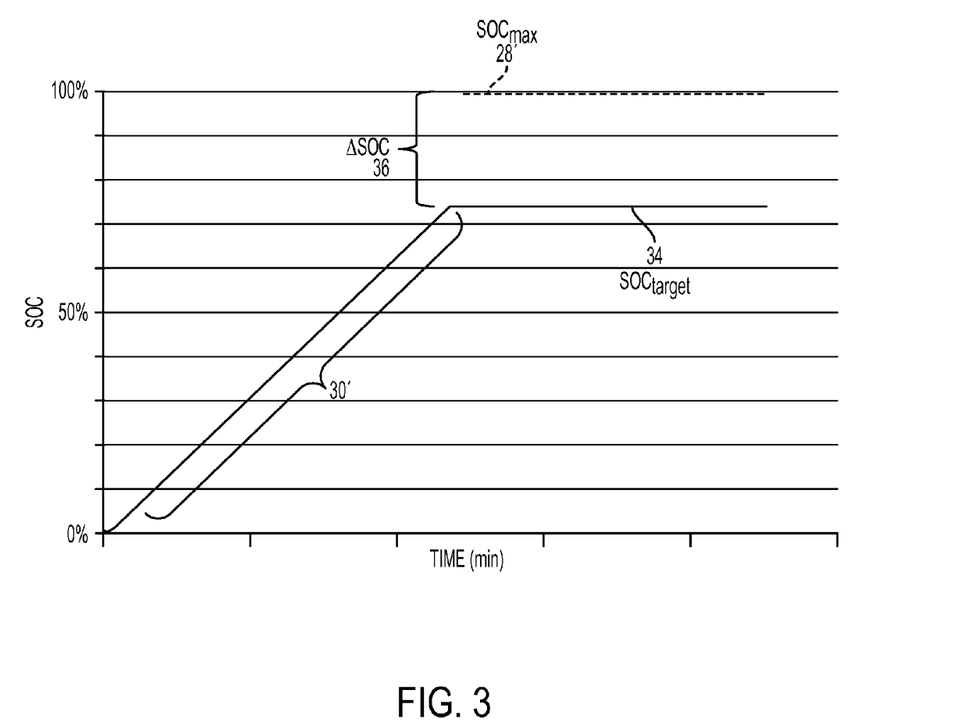
FIG. 3 illustrates an increased efficiency charge profile for charging a traction battery in a plug in vehicle.

Referring to FIG. 3, an increased efficiency or "eco charge" charging profile for a vehicle traction battery is illustrated. As in the previous example, the battery is fully discharged at time t=0. The battery is charged with a substantially constant current through high efficiency charging portion 30'. The battery is charged to a target state of charge ($SOC_{target}$) 34 that is less than $SOC_{max}$ 28'. Preferably, $SOC_{target}$ is an SOC within the high efficiency charging portion 30' of the charging profile, as illustrated here. Although $SOC_{target}$ may be set within a "top off" portion of the charging profile, such an embodiment would result in a less efficient charging cycle. $SOC_{target}$ is less than $SOC_{max}$ by a charge quantity ($\Delta SOC$) 36.

Figure 4:
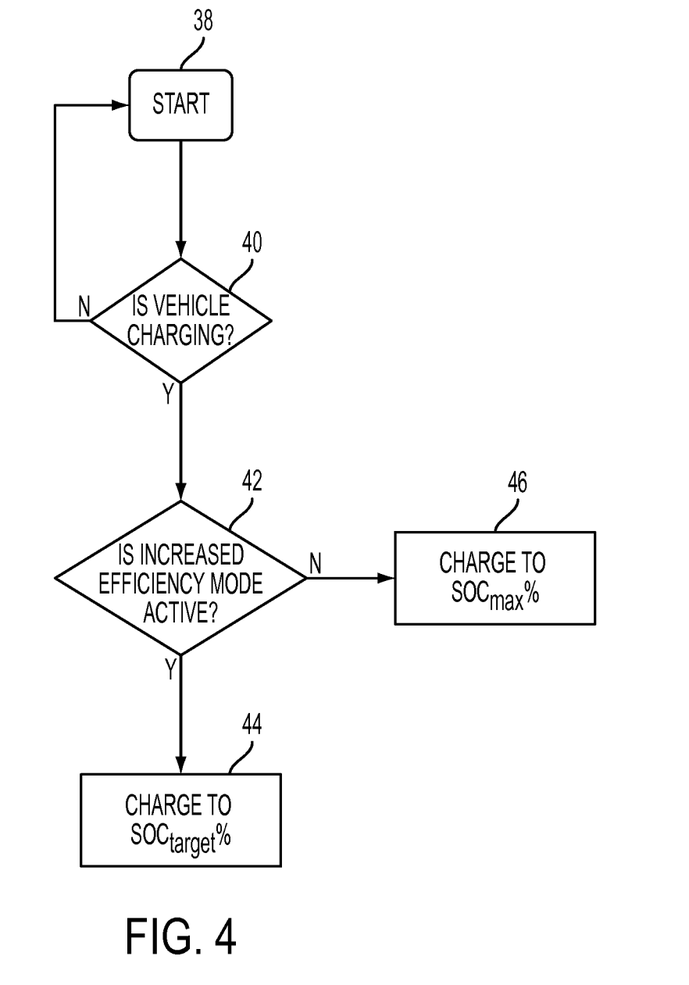
FIG. 4 is a flow chart of an algorithm for selectively enabling an increased efficiency charge mode.

Referring now to FIG. 4, a flow chart illustrates an algorithm for selectively enabling an increased efficiency charging profile. The algorithm begins at block 38. A determination is made of whether the vehicle is charging, as illustrated at operation 40. If no, the algorithm returns to block 38. If yes, then a determination is made of whether an increased efficiency charging mode is active, as illustrated at operation 42. Such a mode may be selected by a user, for example via a user interface 20 as illustrated in FIG. 1A. If the increased efficiency charging mode is active, then the battery is charged to a state of charge equal to $SOC_{target}$%, as illustrated at block 44. If no, then the battery is charged to $SOC_{max}$, as illustrated at block 46.

In some embodiments, this algorithm may be performed by a controller in a vehicle. For example, in the embodiment illustrated in FIG. 1a, the vehicle controller 18 may determine whether the increased efficiency charging mode is active and control the charger interface 24 to discontinue charging once the traction battery 14 has charged to the appropriate SOC. In other embodiments, this algorithm may be performed by a controller in a vehicle in conjunction with a charger controller. For example, in the embodiment illustrated in FIG. 1B, the vehicle controller 18' may determine whether the increased efficiency charging mode is active and communicate the status of the increased efficiency charging mode to the charger controller 26. The charger controller 26 may control the charger 22' to discontinue charging once the traction battery 14' has reached the appropriate SOC. Execution of the algorithm may involve various other controllers as well.

The value of $SOC_{target}$ for the increased efficiency charging mode may be set in various ways in different embodiment. In one embodiment, a driver may manually set $SOC_{target}$. For example, if a PHEV has an $SOC_{max}$ of 99% SOC, a driver could instead set $SOC_{target}$ at 95% SOC. This selection could be made via a user interface, user interface 20 in FIG. 1A. However, such an embodiment results in a decreased range while operating on battery power. Consequently, a user may need to manually vary $SOC_{target}$ over time to optimize the charge limit for the user's driving situation.

In another embodiment, a driver may set a desired electric driving range for an upcoming drive cycle. In response to the desired range, a controller may calculate a corresponding $SOC_{target}$ to provide electric driving operation range. As an example, the $SOC_{target}$ may be calculated based on an average watt-hour per mile usage rate for the vehicle and a known watt-hour per unit SOC usage rate. This calculation may be done using the formula:

$$SOC_{target} = \frac{range * Wh/mi}{Wh/SOC\ \%}.$$

Figure 5:
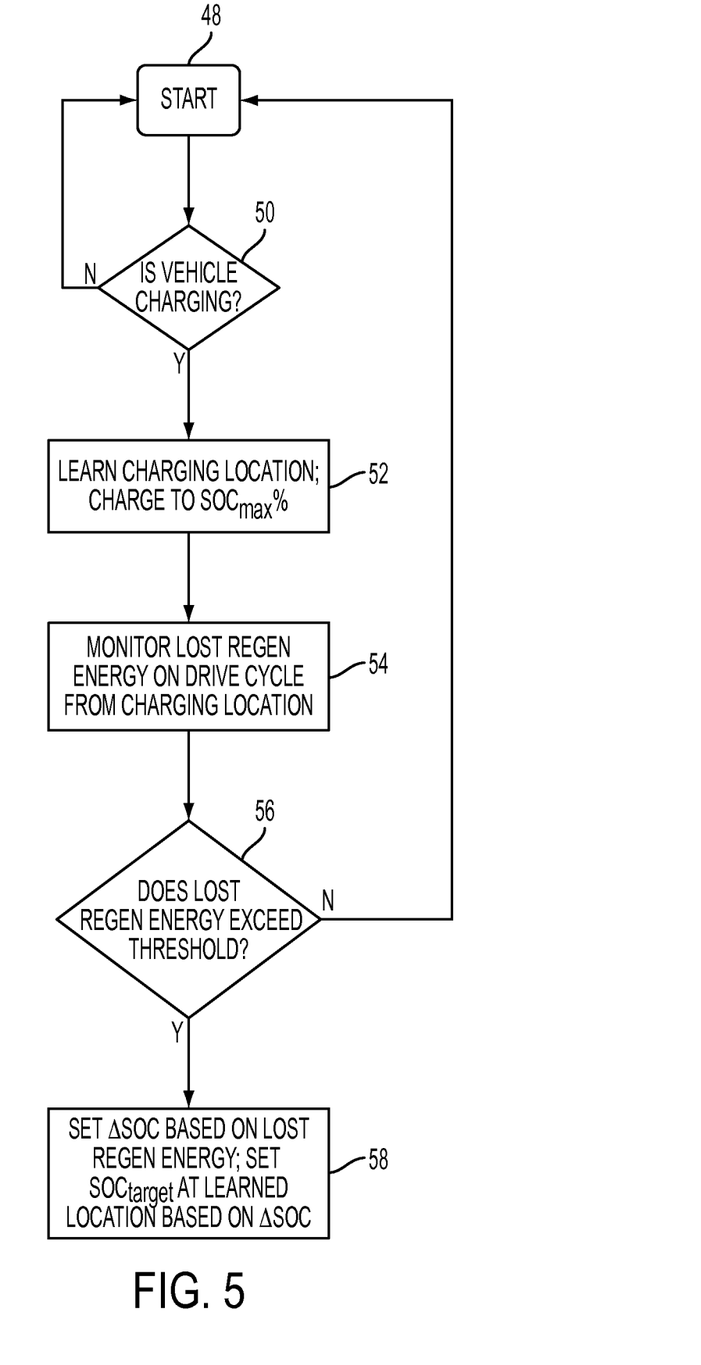
FIG. 5 is a flow chart of an algorithm for charging a vehicle battery according to an increased efficiency mode.

Referring now to FIG. 5, a flow chart illustrates another embodiment for setting $SOC_{target}$. The algorithm begins at block 48. A determination is then made of whether the vehicle is charging, as illustrated at block 50. This determination may be performed, for example, by a vehicle controller such as vehicle controller 18 illustrated in FIG. 1A. If the vehicle is not charging, then operation returns to the start at block 48. If the vehicle is charging, then the charging location is learned and the vehicle is charged to $SOC_{max}$, as illustrated at block 52. On a subsequent drive cycle from the learned charging location, so-called "lost" regenerative charging capacity is monitored. Lost regenerative charging refers to regenerative braking opportunities that are unused because the traction battery is fully charged. In one embodiment, the monitoring is performed over a time interval or distance interval of the drive cycle commencing when the vehicle leaves the charging location. In another embodiment, once the SOC has depleted to a calibratable level (e.g. to 90% SOC), a comparison is made between regenerative energy produced and regenerative energy collected. A determination is made of whether the lost regenerative energy exceeds an associated threshold, as illustrated at block 56. As an example, the associated threshold may be 40 Wh. If no, then the operation returns to start at block 48. If yes, then a charge amount $\Delta SOC$ is determined based on the lost regenerative capacity and $SOC_{target}$ at the learned location is set based on $\Delta SOC$, as illustrated at block 58. This may be performed using the formula: $SOC_{target} = SOC_{max} - \Delta SOC$.

The above algorithm may be repeated at multiple charging locations, each of which may be associated with a charge amount corresponding to a lost regenerative capacity at that respective charging location.

According to various embodiments, $\Delta SOC$ may be set equal to the lost regenerative capacity, or greater or less than the lost regenerative capacity to provide a margin to account for variability in regenerative charging opportunities.

In some embodiments, a calibratable lost regenerative capacity threshold may be provided, and $SOC_{target}$ is lowered only when the lost regenerative capacity during the drive cycle exceeds the associated threshold. In an exemplary embodiment, the calibratable threshold is 0.5% SOC.

In some embodiments, lost regenerative charging opportunities may be monitored over multiple drive cycles. In such embodiments, $SOC_{target}$ is lowered only when regenerative capacity is lost over each of multiple drive cycles. In an exemplary embodiment, $SOC_{target}$ is lowered when regenerative capacity is lost over each of three drive cycles.

Figure 6:
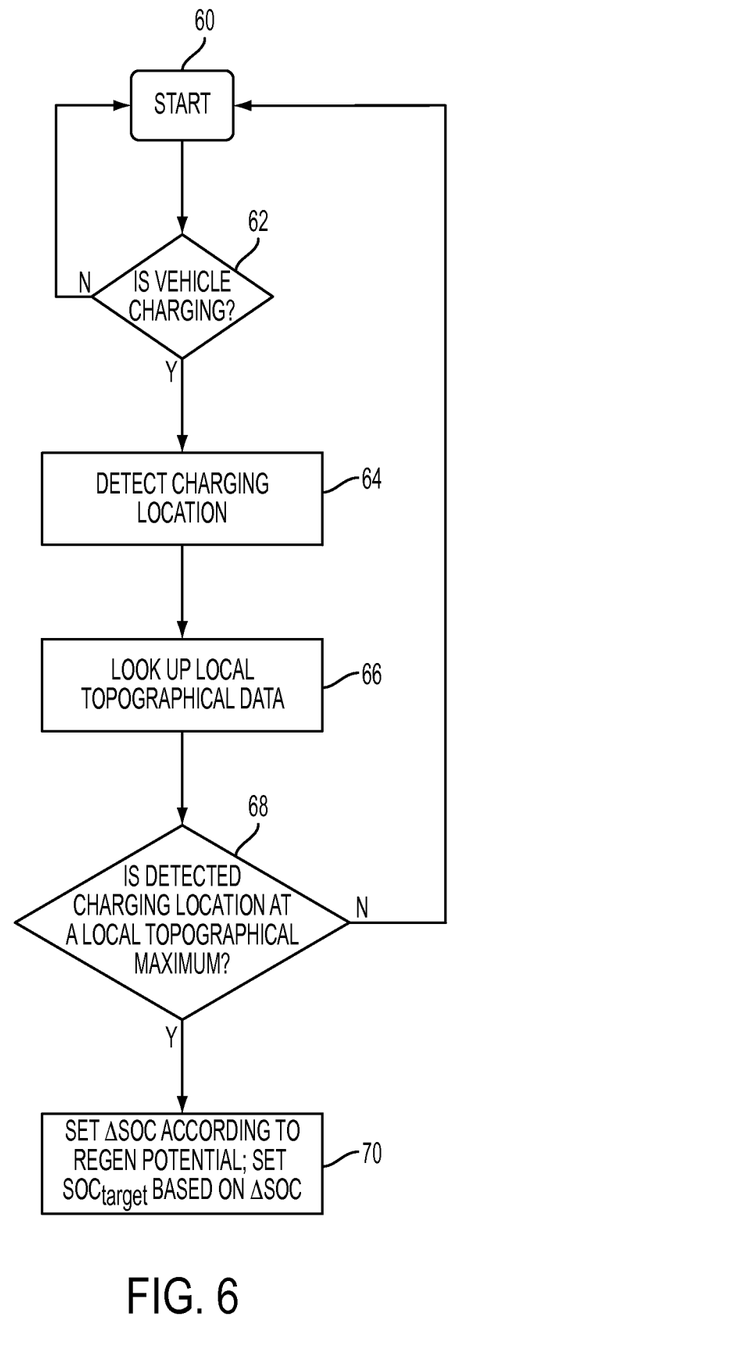
FIG. 6 is a flow chart of another embodiment of an algorithm for charging a vehicle battery according to an increased efficiency mode.

Referring to FIG. 6, a flow chart illustrates another embodiment for setting $SOC_{target}$. The algorithm begins at block 60. A determination is then made of whether the vehicle is charging, as illustrated at block 62. This determination may be performed, for example, by a vehicle controller such as vehicle controller 18 illustrated in FIG. 1A. If the vehicle is not charging, then operation returns to the start at block 60. If the vehicle is charging, then the charging location is detected, as illustrated at block 64. This determination may be performed, for example, via manual user entry or use of an on-board GPS system. Local topographical data is then looked up, as illustrated at block 66. This may be performed via accessing locally stored mapping data, accessing remote mapping data using wireless communications, or other methods known in the art. A determination is then made of whether the detected charging location is at a local topographical maximum, e.g. a hill, as illustrated at block 68. At such locations, surrounding roads are at lower altitudes than the charging location. Drivers generally apply vehicle brakes while driving downhill, and thus if a vehicle is charged at the top of a hill, it may be anticipated that regenerative brakes will be applied as the vehicle descends. If the vehicle is not at a local topographical maximum, then the operation returns to start at block 60. If yes, then a charge amount $\Delta SOC$ is determined based on the regenerative charging potential and $SOC_{target}$ is set based on $\Delta SOC$, as illustrated at block 70. The regenerative charging potential may be based on topographical factors including local gradient and elevation change.

As can be seen from the various embodiments, the present invention provides systems and methods for more efficiently charging a traction battery in a plug in vehicle. In addition, such systems and methods enable regenerative energy to be stored that would otherwise be lost.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a fraction battery; and
   a controller configured to cause the traction battery to be charged to a target state of charge (SOC) less than a maximum SOC based on an amount of charge predicted to be received from an anticipated regenerative braking event during a next drive cycle such that upon occurrence of the anticipated regenerative braking event, the traction battery achieves approximately maximum SOC, the predicted regenerative charge being based on a difference between regenerative energy produced and regenerative energy captured during a previous drive cycle exceeding a calibrated threshold.

2. The vehicle of claim 1, wherein the amount is equal to a difference between the target SOC and maximum SOC.

3. The vehicle of claim 1, wherein the amount is based on a learned vehicle regenerative charging pattern.

4. The vehicle of claim 1, wherein the amount is based on a topographical profile at a detected charging location.

5. The vehicle of claim 4, wherein the topographical profile at the detected charging location is a local maximum elevation at the detected charging location.

6. The vehicle of claim 1, wherein the difference between regenerative energy produced and regenerative energy captured is calculated in response to battery SOC depleting to a calibrated level during the previous drive cycle.

7. The vehicle of claim 1, wherein the difference between regenerative energy produced and regenerative energy captured is calculated in response to a calibrated time interval or distance interval elapsing after the start of the previous drive cycle.

8. A method for charging a battery in a hybrid electric vehicle comprising:
   charging the battery to a target SOC less than a maximum SOC by a predetermined charge corresponding with a predicted regenerative charge from an anticipated regenerative braking event, the predicted regenerative charge being based on a difference between regenerative energy produced and regenerative energy captured during a previous drive cycle exceeding a calibrated threshold.

9. The method of claim 8, wherein the predetermined charge quantity is further based on a learned vehicle regenerative charging pattern.

10. The method of claim 8, wherein the predetermined charge quantity is further based on a topographical profile at a detected charging location.

11. The method of claim 8, wherein the difference between regenerative energy produced and regenerative energy captured is calculated in response to battery SOC depleting to a calibrated level during the previous drive cycle.

12. The method of claim 8, wherein the difference between regenerative energy produced and regenerative energy captured is calculated in response to a calibrated time interval or distance interval elapsing after the start of the previous drive cycle.

13. A battery charger arrangement for a vehicle comprising:
   a battery charger configured to, in response to an anticipated regenerative braking event based on a difference between regenerative energy produced and regenerative energy captured during a previous drive cycle exceeding a calibrated threshold, charge a traction battery of the vehicle to a target SOC less than a SOC corresponding to a fully charged condition for the fraction battery.

14. The battery charger of claim 13, wherein the battery charger is further configured to, in response to user input, charge the traction battery to the SOC corresponding to an approximately fully charged condition.

15. The battery charger of claim 13, wherein the target SOC is less than the SOC corresponding to the fully charged condition by a predetermined charge quantity corresponding with an amount of charge predicted to be received from the anticipated regenerative braking event.

16. The battery charger of claim 15, wherein the predetermined charge quantity is based on a learned vehicle regenerative charging pattern.

17. The battery charger of claim 15, wherein the predetermined charge quantity is based on a topographical profile at a detected charging location.

18. The vehicle of claim 17, wherein the topographical profile at the detected charging location is a local maximum elevation at the detected charging location.

19. The vehicle of claim 13, wherein the difference between regenerative energy produced and regenerative energy captured is calculated in response to battery SOC depleting to a calibrated level during the previous drive cycle.

20. The vehicle of claim 13, wherein the difference between regenerative energy produced and regenerative energy captured is calculated in response to a calibrated time interval or distance interval elapsing after the start of the previous drive cycle.

* * * * *